United States Patent [19]
Albin et al.

[11] Patent Number: 6,069,985
[45] Date of Patent: May 30, 2000

[54] CROSS-FIBER BRAGG GRATING TRANSDUCER

[76] Inventors: Sacharia Albin, 4317 Country Club Cir., Virginia Beach, Va. 23455; Jianli Zheng, 1120 Bolling Ave. 181-C, Norfolk, Va. 23508; Arnel Lavarias, 869 Strickland Blvd., Virginia Beach, Va. 23464

[21] Appl. No.: 09/131,754

[22] Filed: Aug. 10, 1998

[51] Int. Cl.⁷ .................................................. G02B 6/00
[52] U.S. Cl. ............................................. 385/12; 385/37
[58] Field of Search ............................... 385/12, 37, 13, 385/141, 142, 143; 356/32

[56] References Cited

U.S. PATENT DOCUMENTS

| | | |
|---|---|---|
| 4,653,906 | 3/1987 | Dunphy et al. ........................... 356/32 |
| 4,722,600 | 2/1988 | Chiang . |
| 4,725,110 | 2/1988 | Glenn et al. . |
| 4,761,073 | 8/1988 | Meltz et al. . |
| 4,806,012 | 2/1989 | Meltz et al. . |
| 4,807,950 | 2/1989 | Glenn et al. . |
| 4,902,088 | 2/1990 | Jain et al. . |
| 4,996,419 | 2/1991 | Morey . |
| 5,493,390 | 2/1996 | Varasi et al. . |
| 5,513,913 | 5/1996 | Ball et al. . |

OTHER PUBLICATIONS

R. Kashyap, R. Wyatt and R.J. Campbell, "Wideband Gain Flattened Erbium Fibre Amplifier Using a Photosensitive Fibre Blazed Grating", *Electronic Letters*, Jan. 21, 1993, pp. 154–156, vol. 29, No. 2.

M.G. Xu, J.L. Archambault, L. Reekie and J.P. Dakin, "Discrimination Between Strain and Temperature Effects Using Dual–Wavelength Fibre Grating Sensors", *Electronic Letters*, Jun. 23, 1994, pp. 1085–1087, vol. 30, No. 13.

S. E. Kanellopoulos, V.A. Handerek, and A.J. Rogers, "Simultaneous Strain and Temperature Sensing with Photogenerated In–Fiber Gratings", *Optics Letters*, Feb. 1, 1995, pp. 333–335, vol. 20, No. 3.

T. Erdogan and J.E. Sipe, "Tilted Fiber Phase Gratings", *J.Opt.Soc.Am.A* Feb., 1996, pp. 296–313, vol. 13, No. 2.

T. Erdogan, "Fiber Grating Spectra", *Journal of Lightwave Technology*, Aug., 1997, pp. 1277–1294, vol. 15, No. 8.

A.D. Kersey, M.A. Davis, H.J. Patrick, M. LeBlanc, K.P. Koo, C.G. Askins, M.A. Putnam and E.J. Friebele, "Fiber Grating Sensors", *Journal of Lightwave Technology*, Aug., 1997, pp. 1442–1463, vol. 15, No. 8.

*Primary Examiner*—Phan T. H. Palmer
*Attorney, Agent, or Firm*—John F. Carroll, IV; Kimberly A. Chasteen

[57] ABSTRACT

A transducer has been invented that uses specially-oriented gratings in waveguide a manner that allows the simultaneous measurement of physical phenomena (such as shear force, strain and temperature) in a single sensing element. The invention has a highly sensitive, linear response and also has directional sensitivity with regard to strain. The transducer has a waveguide with a longitudinal axis as well as two Bragg gratings. The transducer has a first Bragg grating associated with the waveguide that has an angular orientation $\theta_a$ relative to a perpendicular to the longitudinal axis such that $0° < \theta_a < \theta_{max}$. The second Bragg grating is associated with the waveguide in such a way that the angular orientation $\theta_b$ of the grating relative to a perpendicular to the longitudinal axis is $(360° - \theta_{max}) < \theta_b < 360°$. The first Bragg grating can have a periodicity $\Lambda_a$ and the second Bragg grating can have a periodicity $\Lambda_b$ such that the periodicity $\Lambda_a$ of the first Bragg grating does not equal the periodicity $\Lambda_b$ of the second Bragg grating. The angle of the gratings can be such that $\theta_a = 360° - \theta_b$. The waveguide can assume a variety of configurations, including an optical fiber, a rectangular waveguide and a planar waveguide. The waveguide can be fabricated of a variety of materials, including silica and polymer material.

18 Claims, 5 Drawing Sheets

CROSS-FIBER BRAGG GRATING TRANSDUCER

This invention was made with government support under contract NAS1-98047 awarded by NASA. The Government has certain rights in this invention.

BACKGROUND

The present invention is an optical fiber sensor that utilizes the Bragg effect to enable detection and provision of information relating to a variety of physical phenomena including changes in shear, strain, temperature, and fluid flow. The invention can independently measure physical phenomena simultaneously by use of a single sensing element having two or more particularly-oriented Bragg gratings. The invention has a linear relationship between input and output to facilitate calibration and operation. The invention can provide accurate information affordably in a variety of applications, including monitoring remote and distributed flow in volatile environments such as oil and gas pipes, measuring water flow in hydroelectric power generation environments, measuring shear force impinging on hydrofoils, and monitoring the structural health of buildings and other structures. Because of the ability of the invention to measure shear and temperature independently, the invention has particular utility in distributed and point flow measurement.

Flow measurement techniques presently include thin film anemometry, pressure-sensitive paint, global Doppler velocimetry, and particle image velocimetry. Optical fiber sensors have several inherent advantages over conventional transducers, including, "electrically passive operation, EMI immunity, high sensitivity, and multiplexing capabilities . . . ." Alan D. Kersey et al. "Fiber Grating Sensors," JOURNAL OF LIGHTWAVE TECHNOLOGY Vol. 15 No. 8 1442 at 1442 (August 1997) (hereinafter "Kersey et al."). In addition, fiber grating transducers may be preferred over other types of transducers because they exhibit, "all-fiber geometry, low insertion loss, high return loss or extinction, and potentially low cost [along with] . . . flexibility . . . for achieving desired spectral characteristics." Turan Erdogan, "Fiber Grating Spectra," JOURNAL OF LIGHTWAVE TECHNOLOGY Vol. 15 No. 8 1277 at 1277 (August 1997). However, optical fiber sensors have had difficulty in gaining market acceptance. This may be because "many fiber optic sensors were developed to displace conventional electro-mechanical sensor systems, which are well established, have proven reliability records and manufacturing costs." Id.

Several optical fiber devices have been developed in attempts to overcome these challenges, including sensors that utilize the Bragg effect. A fiber Bragg grating ("FBG") is a group of regular, longitudinally-oriented, finely-spaced, localized alterations in the refractive index of a core of an optical fiber. Fiber Bragg sensors employ FBG's to exploit the Bragg effect within optical fibers and to provide intrafiber, wavelength-specific reflection and transmission. Exposure of an optical fiber with such a grating to physical phenomenon such as strain, stress or temperature changes can cause physical dimensions and optical transmission characteristics of the fiber to be altered. Such alterations can cause changes in that portion of the spectrum of light transmitted through the fiber as well as that portion of the spectrum of light reflected by the grating. Optical fiber sensors that employ a Bragg grating "have an inherent self-referencing capability and are easily multiplexed in a serial fashion along a single fiber." Kersey et al. at 1442.

However, "[o]ne of the most significant limitations of FBG sensors is their dual sensitivity to temperature and strain." Kersey et al. at 1449. "On a single measurement of the Bragg wavelength shift, it is impossible to differentiate between the effects of changes in strain and temperature." M.G. Xu et al. "Discrimination between strain and temperature effects using dual-wavelength fibre grating sensors," ELECTRONICS LETTERS Vol. 30 No. 13 1085 at 1085 (Jun. 23, 1994) (hereinafter "Xu et al."). Several complicated methods have been developed in an attempt to differentiate between thermal and strain effects in fiber Bragg grating devices. These include using reference gratings that are "in thermal contact with the structure, but do not respond to local strain changes." Kersey et al. at 1449. Another approach is to "locate two sensor elements which have very different responses to strain . . . and temperature . . . at the same point on the structure." Id. Additionally, two conventional fiber Bragg gratings have been superimposed on the same fiber and slight differences have been detected in the shifts of the two Bragg wavelengths. See Xu et al. passim. Techniques using a fiber optic interferometer and a combination of an FBG and a fiber polarization-rocking filter have also been used to monitor strain and temperature, but such techniques are cumbersome to implement. In addition, each of the foregoing employs unnecessary and expensive complexities in their execution, including multiple sensing elements; complicated equipment, setup, analysis and signal interpretation; non-linear relationships between inputs and outputs; lack of direction sensitivity with regard to strain; and multiple light sources and spectrum analyzers.

Therefore, there is a need for a transducer that utilizes a fiber Bragg grating in a manner that allows the simultaneous measurement of physical phenomena (such as shear force, strain and temperature) in a single sensing element. Additionally, there is a need for such a device to have a highly sensitive, linear response. Furthermore, in addition to the foregoing, there is a need for such a device to have directional sensitivity with regard to strain. Also, there is a need for such a transducer that does not necessarily employ multiple light sources, specific frequency light sources, and/or multiple spectrum analyzers.

SUMMARY

A transducer have been invented that has a waveguide with a longitudinal axis as well as two Bragg gratings. The transducer has a first Bragg grating associated with the waveguide that has an angular orientation $\theta_a$ relative to a perpendicular to the longitudinal axis such that $0°<\theta_a<\theta_{max}$. The second Bragg grating is associated with the waveguide in such a way that the angular orientation $\theta_b$ of the grating relative to a perpendicular to the longitudinal axis is $(360°-\theta_{max})<\theta_b<360°$. The first Bragg grating can have a periodicity $\Lambda_a$ and the second Bragg grating can have a periodicity $\Lambda_b$ such that the periodicity $\Lambda_a$ of the first Bragg grating does not equal the periodicity $\Lambda_b$ of the second Bragg grating. The angle of the gratings can be such that $\theta_a=360°-\theta_b$. The waveguide can assume a variety of configurations, including an optical fiber, a rectangular waveguide and a planar waveguide. The waveguide can be fabricated of a variety of materials, including silica and polymer material.

The invention can also be a method for making such a transducer. The method can have the steps of providing a waveguide having a longitudinal axis; associating (in a first associating step) a first Bragg grating with the waveguide and associating (in a second associating step) a second Bragg grating with the waveguide. The first Bragg grating can have an angular orientation $\theta_a$ relative to a perpendicular to the longitudinal axis such that $0°<\theta_a<\theta_{max}$ and the second Bragg grating can have an angular orientation $\theta_b$ relative to a perpendicular to the longitudinal axis such that $(360°-\theta_{max})<\theta_b<360°$. The first associating step and the second associating step can be performed together. The first Bragg grating of the first associating step has a periodicity $\Lambda_a$ and the second Bragg grating of the second associating step has a periodicity $\Lambda_b$, whereby the periodicity $\Lambda_a$ of the first Bragg grating does not equal the periodicity $\Lambda_b$ of the second Bragg grating. The method can be performed such that angle of the gratings can be $\theta_a=360°-\theta_b$. The waveguide can assume a variety of configurations, including an optical fiber, a rectangular waveguide and a planar waveguide. The waveguide can be fabricated of a variety of materials, including silica and polymer material.

DRAWINGS

A preferred embodiment of the present invention will be described in greater detail with reference to the accompanying drawings, where like elements bear like reference numerals and where.

DESCRIPTION

Figure 1:
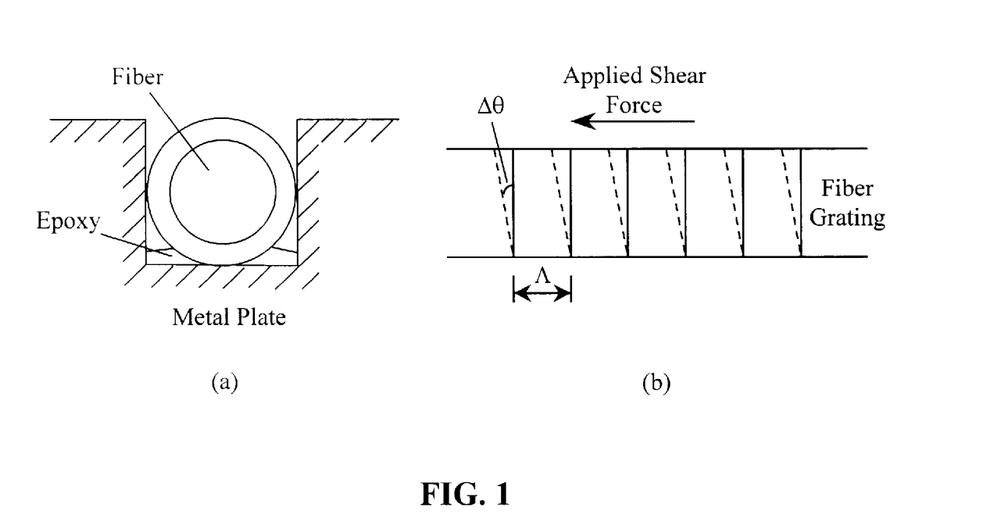
FIG. 1(a) shows across-section of a fiber grating shear force sensor.
FIG. 1(b) shows a shear-induced tilt of a fiber grating in a fiber grating shear force sensor, where the solid line is the original orientation of the grating having period $\Lambda$ and the dashed line is the shear induced change in the orientation of the grating, $\Delta\theta$ from the original orientation.

A fiber grating written on an optical waveguide and subjected to shear stress is shown in FIG. 1. If the waveguiding fiber is mounted flush with a surface, and if a shear force is applied parallel to the fiber axis, the fiber, and its attendant grating will deform from the original position of its spatial orientation. The relative change in spatial orientation of the grating $\Delta\theta$ caused by the shear force can be expressed as:

$$\Delta\theta = \frac{S}{\eta_{eff}} \quad (1)$$

where S is a shear force, and $\eta_{eff}$ is the effective modulus of rigidity of the optical fiber. Small changes in $\Delta\theta$ will not significantly affect the transmission or reflection characteristics of a fiber grating. As a result, any change in the that part of the spectrum reflected by the grating due to the refractive index change (i.e., the change in strain-optic coefficient which was incidentally induced by application of the shear force) is negligible compared to the shift due to the change of the spatial orientation of the grating itself.

Because the change in Bragg wavelength reflected by a grating is predictably related to the change of orientation $\Delta\theta$ of the grating, and because the change in the orientation of the grating $\Delta\theta$ is related to the shear force applied against the fiber, a relationship between the shear force applied against the fiber and the change in Bragg wavelength can be determined as follows.

The Bragg resonance condition is:

$$\lambda_{BS}=2n\Lambda \sin(90°-\Delta\theta)=2n\Lambda \cos \Delta\theta \quad (2)$$

where $\lambda_{BS}$ is the Bragg wavelength, $\Lambda$ is the grating period, and n is the effective refractive index of the fiber core.

When no shear force is applied, $\Delta\theta=0°$ and, thus, $$\lambda_{BO}=2n\Lambda. \quad (3)$$

When a shear force is applied, the Bragg shift $\Delta\lambda_{BS}$ can be expressed as:

$$\Delta\lambda_{BS} = \lambda_{BO} - \lambda_{BS} = 2n\Lambda - 2n\Lambda\cos\Delta\theta \quad (4a)$$

$$= \lambda_{BO}(1 - \cos\Delta\theta) \quad (4b)$$

$$= 2\lambda_{BO}\sin^2\left(\frac{\Delta\theta}{2}\right) \cong \lambda_{BO}\frac{\Delta\theta^2}{2} \quad (4c)$$

since $\Delta\theta$ is small, $\sin(\Delta\theta)\approx\Delta\theta$.

Combining Equation (1) and (4c) yields:

$$\Delta\lambda_{BS} = \frac{1}{2\eta_{eff}^2}\lambda_{BO}S^2 \text{ or } \Delta\lambda_{BS} \propto S^2. \quad (5)$$

In theory, by application of this relationship, changes in the applied shear force can be measured by monitoring the Bragg shift. However, if the Bragg shift $\Delta\lambda_{BT}$ due to temperature change $\Delta T$ is also considered, the total Bragg shift is given as:

$$\Delta\lambda_B = \Delta\lambda_{BS} + \Delta\lambda_{BT} = \lambda_{BO}\frac{\Delta\theta^2}{2} + \lambda_{BO}\left(\alpha + \frac{dn/dT}{n}\right)\Delta T \quad (6)$$

where $\alpha$ is the linear thermal expansion coefficient.

The fiber Bragg grating can also be fabricated such that the original position of the spatial orientation is tilted by an angle $\theta$ from the normal. The Bragg resonance condition becomes $$\lambda_{BS}=2n\Lambda \sin(90°-(\theta-\Delta\theta))=2n\Lambda \cos(\upsilon-\Delta\theta) \quad (7)$$

when a flow induces a change in the tilt by $\Delta\theta$. The Bragg wavelength shifts for small positive and negative changes in $\Delta\theta$ will be different, resulting in a shorter and longer wavelength, respectively. This gives the advantage that flow direction, which creates the shear stress, can be determined.

Figure 2:
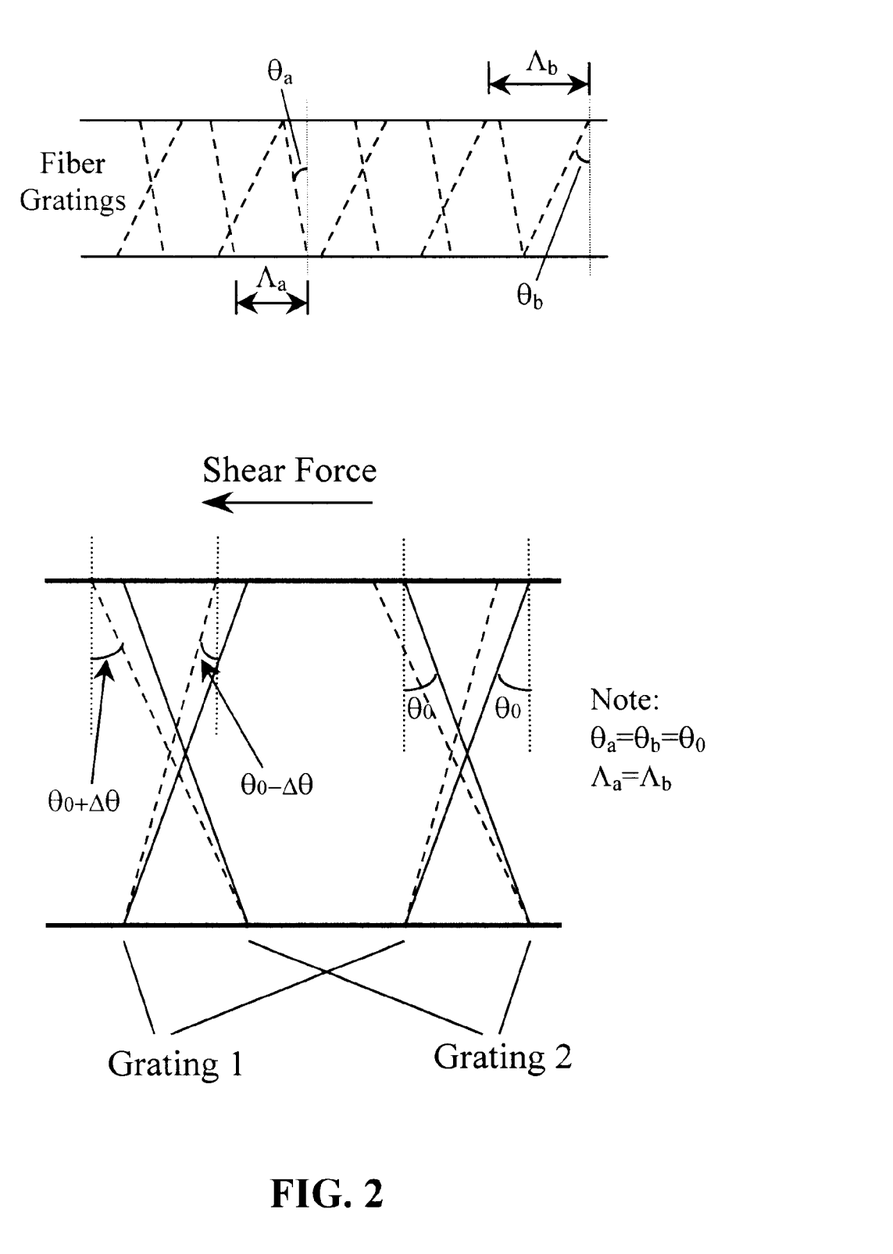
FIG. 2 shows a detail of two tilted FBGs in a sensor of the present invention subjected to a shear force, where the solid line is the original orientation of the gratings, $+\theta_0$ and $-\theta_0$ for Grating 1 and Grating 2, respectively, and where the tilt angles are changed to $\theta_0+\Delta\theta$ and $\theta_0-\Delta\theta$, respectively after shear is induced.

As discussed in the Background section, infra, distinguishing the shear force effect from the temperature effect based on the Bragg shift of a single FBG is very difficult. The present invention creatively solves this problem by use of at least two tilted gratings written in the same region of the fiber core. A detail of a structure schematically embodying an apparatus of the present invention is shown in FIG. 2. In that illustration, both Grating 1 and Grating 2 are written at a "cross-tilted" angle of $\pm\theta_0$ (i.e., one grating oriented at a tilt of $\theta_0$ to a perpendicular to the longitudinal axis of the fiber, and the other grating tilted at $360°-\theta_0$ to a perpendicular to the longitudinal axis of the fiber) with respect to the vertical (i.e., the latitudinal cross-section) of a fiber. If a shear force is applied along the fiber (i.e., longitudinally) in the direction shown in FIG. 2, the tilt angle of Grating 1 will increase, while that of Grating 2 will decrease, as shown by the dashed lines in that illustration. Note that because the direction of this increase and decrease is related to the direction of application of shear force, the invention exhibits sensitivity to the direction of application of shear force.

On the other hand, temperature changes will cause changes in $\Lambda$, as well as changes in n, but these changes will be in the same direction for both Grating 1 and Grating 2. As a result, temperature effects on the present invention are not directional, and the Bragg shift will be equal and in the same direction for the two gratings. If we take the difference of the Bragg shifts of the two gratings, the temperature effect can be canceled. This can be described by the following analysis, using the subscripts "1" and "2" for Gratings 1 and 2, respectively:

$$\Delta\lambda_{B1} = \Delta\lambda_{BS1} + \Delta\lambda_{BT} = \lambda_{B0}\frac{(\theta_0 + \Delta\theta)^2}{2} + \lambda_{B0}\left(\alpha + \frac{dn/dT}{n}\right)\Delta T \quad (8a)$$

$$\Delta\lambda_{B2} = \Delta\lambda_{BS2} + \Delta\lambda_{BT} = \lambda_{B0}\frac{(\theta_0 - \Delta\theta)^2}{2} + \lambda_{B0}\left(\alpha + \frac{dn/dT}{n}\right)\Delta T \quad (8b)$$

$$\Delta\lambda = \Delta\lambda_{B2} - \Delta\lambda_{B1} = 2\lambda_{B0}\theta_0\Delta\theta = \frac{2}{\eta_{eff}}\lambda_{B0}\theta_0 S \quad (9)$$

and $\Delta\lambda$ $\Delta\theta$, $\Delta\lambda$ S.

Thus it is demonstrated that cross-tilted FBGs can compensate for thermally-induced strain in the model structure by eliminating the temperature effect from consideration. This has the additional benefit of enhancing shear stress sensitivity and providing a linear response between the shear force S and wavelength shift $\Delta\lambda$, Equation 9, rather than the parabolic dependence as shown in traditional applications illustrated by Equation 5 (i.e., as shown for applications with a single grating). Additionally, the Bragg shift is proportional to the amount of change in the angle orientation $\Delta\theta$ of the FBG. The maximum tilt angle for a fiber grating is limited by the guidance condition for the core mode. Therefore, the maximum tilt angle $\theta_{max}$ can be described by:

$$\theta_{max} \leq \sin^{-1}[\Lambda(n_{core}^2 - n_{cladding}^2)^{1/2}/\lambda] \quad (10)$$

For standard communication fibers, the estimated maximum tilt angle is typically about three degrees (3°).

As described above, the Bragg wavelength of an FBG with small, regular deviations in the spatial orientation of the FBG from the vertical would only be negligibly different than the Bragg wavelength of a similar FBG that had an entirely vertical orientation. Therefore, two FBGs with original spatial orientations of $\pm\theta_0$ would be expected to produce the same Bragg wavelength if both gratings had the same period and if $\theta_0$ was small. However, if the FBGs differ only in orientation, then the Bragg reflections will overlap when there is no applied shear force or even a small applied shear force. To avoid this, the Bragg wavelength of the undeformed gratings can be different, which can be achieved either by providing the gratings with different spatial orientations to the vertical or by providing the gratings with different periods. Since $\theta_0$ appears as a quadratic term in Equation 8a and b, providing the gratings with different angles relative to the vertical will result in a nonlinear Bragg wavelength response. Therefore, to obtain a linear response, providing FBGs with different periods is preferred. For such an arrangement, the Bragg wavelength shift introduced by temperature can be eliminated by modifying Equation 8a and b as follows:

$$\Delta\lambda'_{B1} = \Delta\lambda_{BS1} + \Delta\lambda_{BT} = \lambda_{B01}\frac{(\theta_0 + \Delta\theta)^2}{2} + \lambda_{B01}\left(\alpha + \frac{dn/dT}{n}\right)\Delta T \quad (11a)$$

$$\Delta\lambda'_{B2} = \Delta\lambda_{BS2} + \Delta\lambda_{BT} = \frac{\lambda_{B02}(\theta_0 + \Delta\theta)^2}{2} + \lambda_{B02}\left(\alpha + \frac{dn/dT}{n}\right)\Delta T \quad (11b)$$

where $$\lambda_{B01} = 2n\Lambda_1; \lambda_{B02} = 2n\Lambda_2. \quad (11c)$$

Equation 9 for the net Bragg shift can then be adapted as follows:

$$\Delta\lambda' = \Delta\lambda'_{B1} - \frac{\lambda_{B01}}{\lambda_{B02}}\Delta\lambda'_{B2} = 2\lambda_{B01}\theta_0\Delta\theta = \frac{2}{\eta_{eff}}\theta_0\lambda_{B01}S. \quad (12)$$

Hence, $\Delta\lambda'$ $\Delta\theta$ and $\Delta\lambda'$ S.

Figure 3:
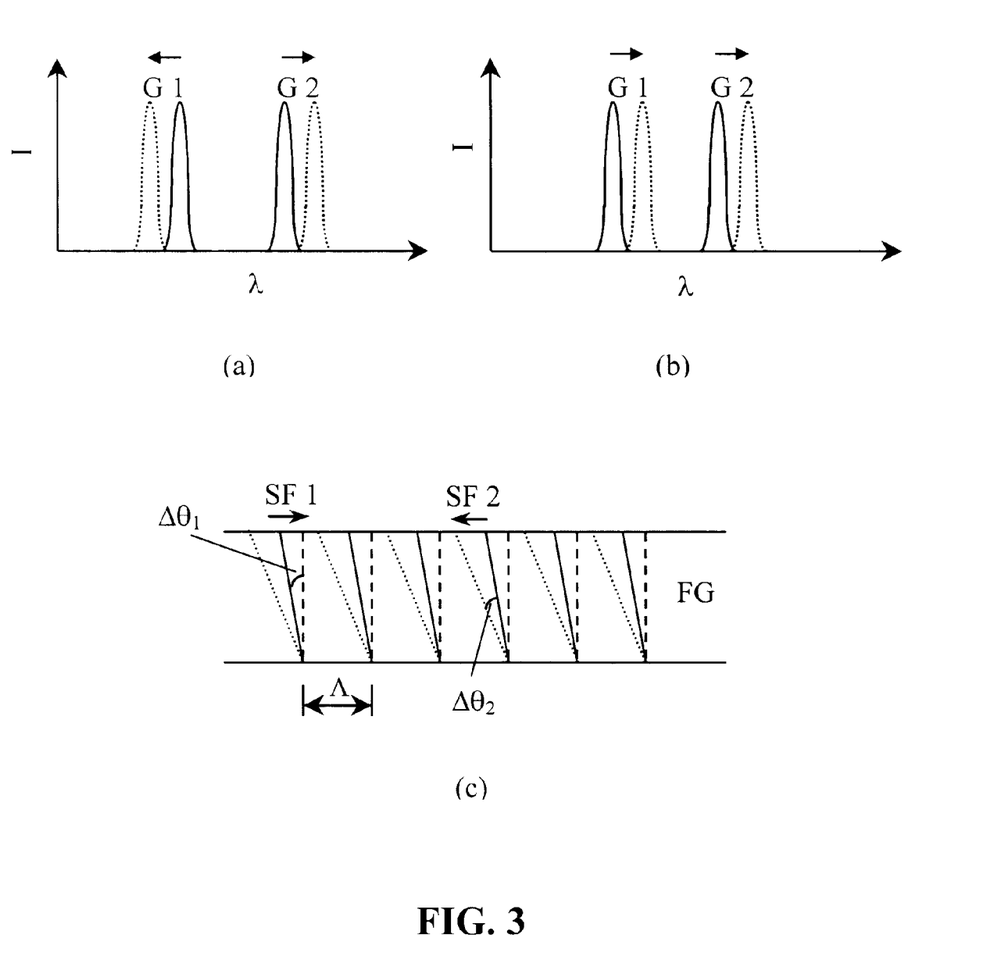
FIG. 3(a) is an illustration of the reflected Bragg wavelength shifts of a sensor of the present invention due to shear stress, illustrating on a plot of intensity ("I") versus wavelength ("λ") an inverse relationship in the direction of shift of the reflected wavelengths associated with Grating 1 ("G 1") and Grating 2 ("G 2"), respectively.
FIG. 3(b) is an illustration of the reflected Bragg wavelength shifts of a sensor of the present invention due to temperature change, illustrating on a plot of intensity ("I") versus wavelength ("λ") a direct relationship in the direction of shift of reflected wavelengths associated with Grating 1 ("G 1") and Grating 2 ("G 2"), respectively.
FIG. 3(c) shows a tilted sensor with a grating ("FG") tilted $\Delta\theta$ from the normal, showing that $\Delta\theta$ increases if the ("SF 1") is from right to left or decreases if the shear force ("SF 2") is from left to right, thereby illustrating that the sensor can determine shear orientation.

A dual FBG apparatus embodying this design will demonstrate a reflected wavelength response to shear stress and temperature as illustrated in FIG. 3.

For example, assume that a pair of crossed gratings are tilted at $\pm 1°$ and co-written in a 125 $\mu$m diameter single mode fiber such as may be obtained from Innovative Fibers, Canada. Each grating has different grating periods suitable for Bragg wavelengths that are separated by the sum of FWHM of both peaks plus 1 nm. The cross-tilted FBG can be mounted on a metal plate in a 126 $\mu$m-deep groove with epoxy so that the fiber will be flush with the surface of the plate. The mounted grating can be immersed in a water bath, and the temperature can be controlled within $\pm 0.1°$ C. The wavelength shift for each FBG can be measured at various temperatures. The net Bragg shift is given in Equation 9. This demonstrates that temperature compensation can be achieved using cross-tilted FBGs.

Figure 4:
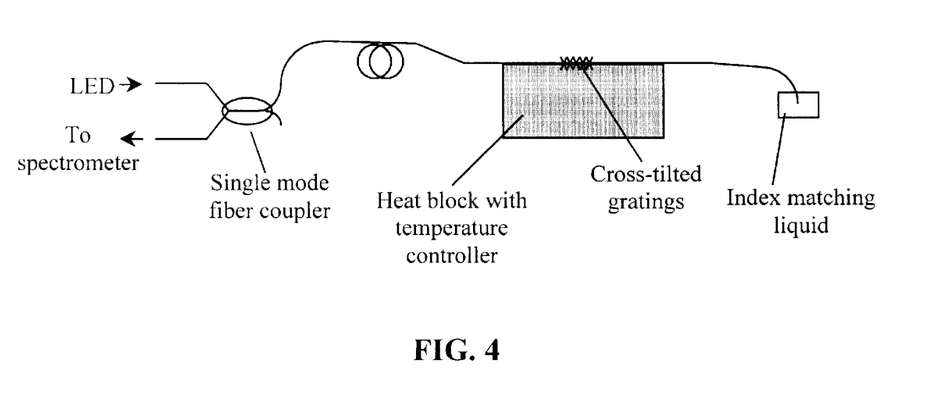
FIG. 4 is a hypothetical temperature experiment setup for a sensor of the present invention.

Assume that the experimental setup is presented in FIG. 4. An LED source that emits electromagnetic radiation of a spectrum capable of being returned in part as a Bragg wavelength of the two gratings is coupled to the fiber. The reflected signal from the two gratings is directed by a coupler to an optical spectrum analyzer or a spectrometer with an attached CCD, and data related to shifts in reflected wavelengths are recorded in a computer. Wavelength resolution better than 0.0007 nm is expected to be achievable for a 256-pixel CCD if the center wavelength is calculated with a weighted average of the center wavelengths of illuminated pixels scaled by each pixel's detected signal.

Assume that a metal plate on which the cross-tilted FBGs are attached will be subjected to strain and net Bragg wavelength shift will be monitored to verify that the sensor is insensitive to deformation-induced strain. The same metal plate (with the fiber containing cross-tilted FBGs) will be placed in a water tunnel, such as a Recirculating Hydrodynamic Flow Visualization System capable of Reynolds numbers up to 48,000. A high shear force can be created with a moderate water flow in such a water tunnel because the density of water (e.g., 998.62 g/L at 20° C.) is approximately three orders of magnitude higher than that of dry air (1.14 g/L at 20° C.). The flow rate will be varied to create different shear forces and monitored using a flow meter. Similarly, the Bragg wavelength shift as a function of flow rate will be measured with the water flow on the cross-tilted FBG. The transition from laminar to turbulent flow can be visualized by adding Fluorescein dye in water. The dye will be illuminated with an argon ion laser. When exposed to shear force induced by the fluid flow, the Bragg reflection peaks can be monitored. As instrumented, the fiber containing the cross-written FBGs would be expected to detect shear forces relevant to flow transition, which could be confirmed by the illuminated dye.

Fluid flow analysis, such as that performed in relation to wind tunnel models, often necessitates monitoring of both temperature and strain at the same location. A conventional FBG sensor may be embedded in or mounted on a model in an attempt to provide such information; however, such an FBG will respond indiscriminately to changes in temperature and strain. Assuming temperature and strain effects are linear and independent, the Bragg shift can be expressed as:

$$\Delta\lambda_B(\epsilon,T) = K_\epsilon \Delta\epsilon + K_T \Delta T \quad (13)$$

where $K_\epsilon = \partial\lambda/\partial\epsilon$ is determined by the Poisson ratio, refractive index of the fiber core, and the photoelastic coefficient of the fiber; and $K_T = \partial\lambda/\partial T$ is related to the thermal expansion coefficient and thermo-optic coefficient of the fiber.

As described herein, temperature and strain are not readily distinguishable by merely monitoring the Bragg wavelength shift precipitated by a single FBG. Also, it is important to note that the thermo-optic and photoelastic coefficients of the fiber are wavelength dependent. If two Bragg gratings are co-written on the same fiber, the fractional wavelength shift due to temperature and strain on the two superimposed gratings will be different. Thus, it is possible to simultaneously determine the temperature and strain if the ratio of the strain response of the two gratings is different from the ratio of their temperature response.

For example, it is known in the art that co-written, traditionally-oriented (i.e., vertically oriented) FBGs will obey the relationship described in the following matrix:

$$\begin{pmatrix} \Delta\lambda_{B1} \\ \Delta\lambda_{B2} \end{pmatrix} = \begin{pmatrix} K_{\epsilon 1} K_{T1} \\ K_{\epsilon 2} K_{T2} \end{pmatrix} \begin{pmatrix} \epsilon \\ T \end{pmatrix} \quad (14)$$

This matrix can be inverted to determine strain and temperature from the wavelength shifts of two FBGs. The elements of the K matrix can be experimentally obtained by separately measuring the Bragg wavelength shifts in the absence of temperature changes and also in the absence of strain changes. This same relationship can be used to discriminate between temperature changes and strain changes in an apparatus of the present invention. However, because of the orientation of the FBGs of the present invention, the present invention has greatly increased sensitivity over sensors that employ traditionally-oriented FBGs.

For example, assume that a pair of FBGs with Bragg wavelength of 850 and 1550 nm were written on a single fiber and the fiber was mounted on a cantilevered beam. Strain can be applied to the beam using calibrated weights, and temperature can be varied using heater foil attached to the beam. Both Bragg reflection peaks can be monitored. Keeping the temperature constant, the Bragg shift can be measured as a function of applied strain. Then, with no applied strain, Bragg shift versus temperature can be measured. These data provide critical parameters for the K matrix of Equation 13. Thus calibrated, such an instrumented beam would be expected to independently determine simultaneous changes in temperature and strain.

Thus, it can be seen that the present invention can use fiber Bragg gratings in a manner that allows the simultaneous measurement of physical phenomena (such as shear force, strain and temperature) in a single sensing element. Additionally, it has been demonstrated that a device has been invented that has a highly sensitive, linear response. Furthermore, in addition to the foregoing, it has been shown that such a device can have directional sensitivity with regard to strain. Also, such a transducer has been invented that does not necessarily need to employ multiple light sources, specific frequency light sources, and/or multiple spectrum analyzers. The present invention can be used in a variety of applications, including: remote and distributed flow measurement in explosive environments, such as in oil and gas transmission systems; water flow measurement within hydroelectric power generation systems; simultaneous flow and temperature measurement in industrial processes; shear force measurements critical in the design of hydrofoils; health monitoring of structures such as bridges and buildings; and viscosity measurement of liquids.

Figure 5:
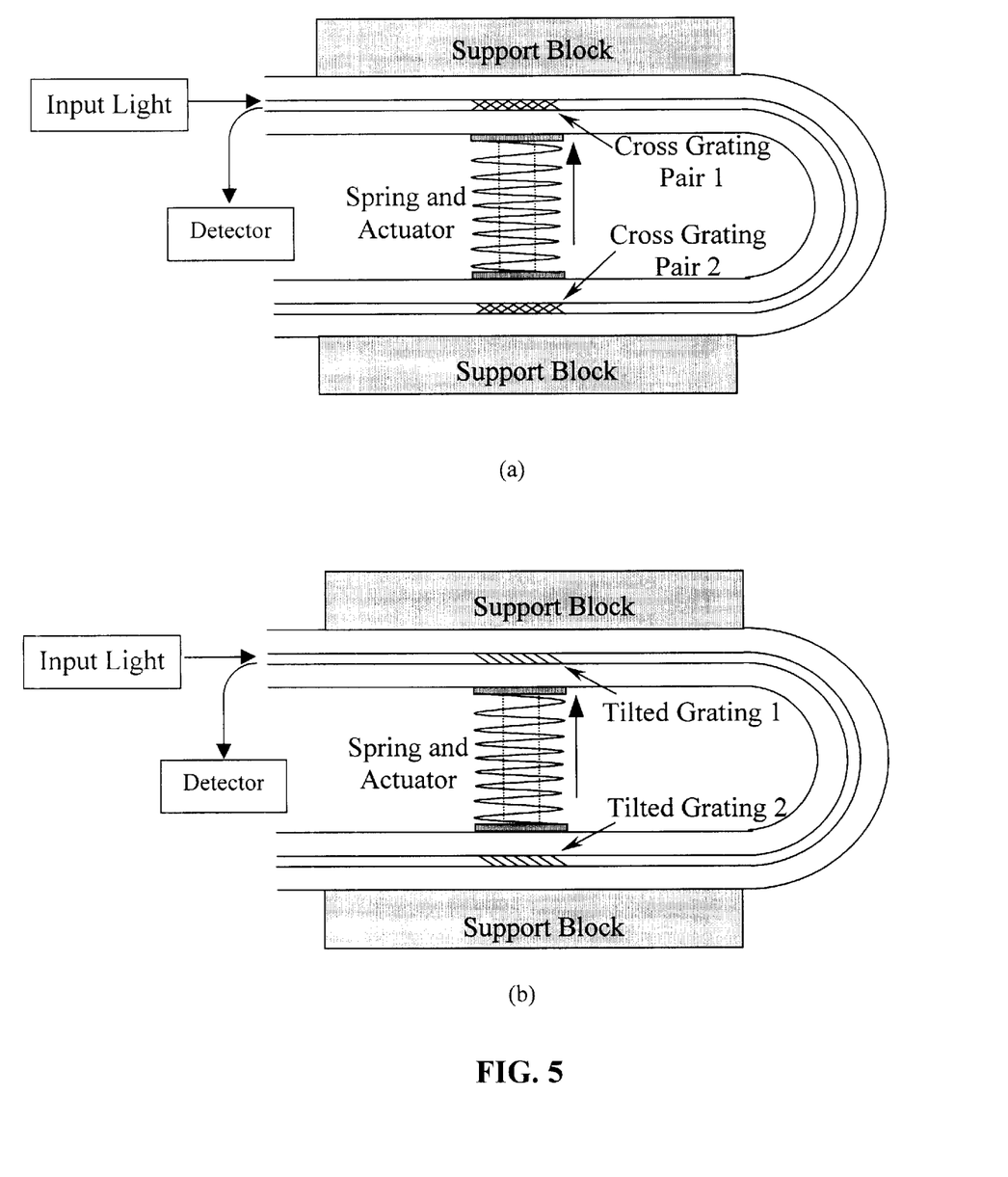
FIG. 5 shows a force or pressure sensor that uses a pair of (a) cross-tilted or (b) tilted fiber Bragg gratings.

It should be understood that the described embodiments merely illustrate principles of the invention. Many modifications, additions and deletions may be made without departure from the description provided. For example, as shown in FIG. 5, force or pressure can be measured independently of temperature using a pair of tilted or cross-tilted gratings, as may be needed in an application such as monitoring the actuator position in a fuel injector of an automobile engine or monitoring combustion chamber pressure. The force exerted by the spring shown in that figure is proportional to the displacement of the actuator. When the force is applied upward, the tilt angles of the grating pair (1) in (a) increase, while the tilt angles of the grating pair (2) decrease. This produces a corresponding decrease and increase in the reflected Bragg wavelengths from these gratings. The situation reverses when the force is downward. Such a signal eliminates the temperature-induced shift as already described. A single fiber connected with a suitable source and detector can monitor multiple actuator positions using multiple gratings. Such can also be implemented using a pair of tilted fiber Bragg gratings, as shown in (b) of FIG. 5.

As yet another alternative modification of the invention, a series of cross-tilted FBGs, more than merely a pair may be used to increase sensitivity across broad ranges of changes in temperature, shear or other physical phenomena. Also, as described herein, traditionally-shaped optical fibers in the form of right circular cylinders can be used as a waveguide structure for the invention. However, alternatively shaped waveguide structures, such as rectangular or planar waveguides, can be easily substituted. Additionally, the waveguide structures described herein can be fabricated of traditional materials, such as silica. However, the waveguides can also be made of optically transmissive materials that have a lower coefficient of rigidity than silica, such as those made of polymer composition. Decreasing the rigidity of waveguides allows for a greater deformation in the presence of shear. Greater deformation of the waveguide allows for an increase in wavelenth shift. Increased wavelength shift produces greater sensitivity of the invention in the presence of shear.

What is claimed is:

1. A transducer comprising:

a waveguide having a longitudinal axis;

a first Bragg grating associated with the waveguide, the first Bragg grating having an angular orientation $\theta_a$ relative to a perpendicular to the longitudinal axis such that $0°<\theta_a<\theta_{max}$; and a second Bragg grating associated with the waveguide, the second Bragg grating having an angular orientation $\theta_b$ relative to a perpendicular to the longitudinal axis such that $(360°-\theta_{max})<\theta_b<360°$.

2. The transducer of claim 1 wherein:

the first Bragg grating has a periodicity $\Lambda_a$; and the second Bragg grating has a periodicity $\Lambda_b$, whereby the periodicity $\Lambda_a$ of the first Bragg grating does not equal the periodicity $\Lambda_b$ of the second Bragg grating.

3. The transducer of claim 1 wherein:

$\theta_a=360°-\theta_b$.

4. The transducer of claim 1, wherein the waveguide is selected from the group consisting of an optical fiber, a rectangular waveguide and a planar waveguide.

5. The transducer of claim 4, wherein the waveguide is fabricated of material selected from the group consisting of silica and polymer material.

6. A transducer comprising:

a means for conducting an optical signal, the optical signal conducting means having a longitudinal axis;

a first means for refracting associated with the optical signal conducting means, the first refracting means having an angular orientation $\theta_a$ relative to a perpendicular to the longitudinal axis such that $0°<\theta_a<\theta_{max}$; and a second means for refracting associated with the optical signal conducting means, the second refracting means having an angular orientation $\theta_b$ relative to a perpendicular to the longitudinal axis such that $(360°-\theta_{max})<\theta_b<360°$.

7. The transducer of claim 6 wherein:

the first refracting means has a periodicity $\Lambda_a$; and the second refracting means has a periodicity $\Lambda_b$, whereby the periodicity $\Lambda_a$ of the first refracting means does not equal the periodicity $\Lambda_b$ of the second refracting means.

8. The transducer of claim 7 wherein:

$\theta_a=360°-\theta_b$.

9. A method for making a transducer comprising the following steps:

providing an optical signal conducting means having a longitudinal axis;

associating, in a first associating step, a first means for refracting with the optical signal conducting means, the first refracting means having an angular orientation $\theta_a$ relative to a perpendicular to the longitudinal axis such that $0°<\theta_a<\theta_{max}$;

associating, in a second associating step, a second means for refracting with the optical signal conducting means, the second refracting means having an angular orientation $\theta_b$ relative to a perpendicular to the longitudinal axis such that $(360°-\theta_{max})<\theta_b<360°$.

10. The method of claim 9, wherein:

the first refracting means of the first associating step has a periodicity $\Lambda_a$;

the second refracting means of the second associating step has a periodicity $\Lambda_b$, whereby the periodicity $\Lambda_a$ of the first refracting means does not equal the periodicity $\Lambda_b$ of the second refracting means.

11. The method of claim 9, wherein:

$\theta_a=360°-\theta_b$.

12. The method of claim 9 wherein the first associating step and the second associating step are performed together.

13. A method for making a transducer comprising the following steps:

providing a waveguide having a longitudinal axis;

associating, in a first associating step, a first Bragg grating with the waveguide, the first Bragg grating having an angular orientation $\theta_a$ relative to a perpendicular to the longitudinal axis such that $0°<\theta_a<\theta_{max}$;

associating, in a second associating step, a second Bragg grating with the waveguide, the second Bragg grating having an angular orientation $\theta_b$ relative to a perpendicular to the longitudinal axis such that $(360°-\theta_{max})<\theta_b<360°$.

14. The method of claim 13 wherein the first associating step and the second associating step are performed together.

15. The method of claim 13, wherein:

the first Bragg grating of the first associating step has a periodicity $\Lambda_a$;

the second Bragg grating of the second associating step has a periodicity $\Lambda_b$, whereby the periodicity $\Lambda_a$ of the first Bragg grating does not equal the periodicity $\Lambda_b$ of the second Bragg grating.

16. The method of claim 13, wherein:

$\theta_a=360°-\theta_b$.

17. The method of claim 13, wherein the waveguide is selected from the group consisting of an optical fiber, a rectangular waveguide and a planar waveguide.

18. The method of claim 17, wherein the waveguide is fabricated of material selected from the group consisting of silica and polymer material.

* * * * *

UNITED STATES PATENT AND TRADEMARK OFFICE
CERTIFICATE OF CORRECTION

PATENT NO : 6,069,985
DATED : May 30, 2000
INVENTOR(S) : Albin, Sacharia, et al

It is certified that error appears in the above-identified patent and that said Letters Patent are hereby corrected as shown below:

Title page, item [54], "CROSS-FIBER BRAGG GRATING TRANSDUCER", should be --CROSS-TILTED FIBER BRAGG GRATING TRANSDUCER--

At page 1, line [76], "Arnel Lavarias", should be --Arnel C. Lavarias--

At column 1, title "CROSS-FIBER BRAGG GRATING TRANSDUCER", should be --CROSS-TILTED FIBER BRAGG GRATING TRANSDUCER--

At column 3, line 8, "←b", should be --$\Lambda$ b--

At column 3, line 23, "across-section", should be --a cross-section--

At column 5, line 47, "and $\Delta\lambda \quad \Delta\theta$, $\Delta\lambda \quad S$.", should be --and $\Delta\lambda \propto \Delta\theta$, $\Delta\lambda \propto S$.

At column 6, line 23, "$\lambda_{B02}(\theta_o + \Delta\theta)2$", should be --$\lambda_{BB2} \dfrac{(\theta_o + \Delta\theta)2}{2}$--
$\phantom{At column 6, line 23, "}\overline{\phantom{xx}2\phantom{xx}}$ At column 6, line 36, "Hence, $\Delta\lambda' \quad \Delta\theta$ and $\Delta\lambda' \quad S$.", should be --Hence, $\Delta\lambda' \propto \Delta\theta$ and $\Delta\lambda' \propto S$.

Signed and Sealed this

Twenty-second Day of May, 2001

Attest:

NICHOLAS P. GODICI

*Attesting Officer*   *Acting Director of the United States Patent and Trademark Office*